United States Patent Office 2,972,624
Patented Feb. 21, 1961

2,972,624

SEPARATION OF FATTY ACIDS FROM OXIDIZED FISH OILS

Jack J. Bulloff, Dayton, Ohio, assignor to The Commonwealth Engineering Company of Ohio, Dayton, Ohio, a corporation of Ohio No Drawing. Filed Oct. 4, 1955, Ser. No. 538,536

4 Claims. (Cl. 260—414)

This invention relates to the isolation of fatty acids contained in aqueous and aqueous alkaline solutions and to the separation of monocarboxylic acids from aqueous solutions containing, in addition to the monocarboxylic acids, dicarboxylic acids.

One important field of application for the method of the invention is the separation of fatty acids from aqueous solutions resulting from the oxidation or oxidative splitting of fish oils, vegetable or animal oils, fats and waxes.

Fish oils are inexpensive and abundant but are not useful per se because of their offensive odor and instability. The acids derived from the fish oils are equally offensive in odor and difficult to separate into useable and recoverable components. Improvements in the fish oils by hydrogenation have to compete with hydrogenated tallow products.

The oxidative splitting of fish oils produces complex mixtures which have not, so far, been found useful as such, and these are not commercially competitive with controlled products obtained by the similar splitting of separable fat acids such as oleic acid. The separation of dicarboxylic acid from monocarboxylic acid products of the oxidative splitting of such fish oil acids leads to the acquisition of two useful types of industrial stock, (a) dicarboxylic acids which are directly useful in the making of polymers (resins, including alkyds, plastics and the like), and (b) aluminum monohydroxy bis-monocarboxylate soap, directly useful as a source of fatty acids free from the objectionable characteristics of the parent fish oil fatty acids.

There is not available a method for recovering the fatty acids from fish oils or their oxidation products which is economical and simple.

An object of the present invention is to provide a simple, economical method for isolating the fatty acids from dilute aqueous solutions containing the same and particularly such aqueous solutions resulting from the oxidation of fish and similar oils.

Another object of the invention is to remove the fatty acids from aqueous solutions containing them in admixture with dicarboxylic acids, leaving the dicarboxylic acids in aqueous solution substantially free from monocarboxylic acids.

In accordance with the invention, the aqueous solution containing the fatty acids or both fatty and dicarboxylic acids is saponified and added to an excess (5% to 30% of the stoichiometric amount) of an aqueous solution of a water-soluble aluminum salt. An aluminum soap of the monocarboxylic acid is formed and precipitates. The soap may be removed from the solution by filtration and used per se, or the acid may be liberated therefrom by treating the soap with a mineral acid.

The monohydroxy aluminum soaps of the fatty acids are substantially insoluble in water at pH between 4 and 9. The addition of mineral acids to the washed precipitate releases the monocarboxylic acid from the soap. Dicarboxylic acids which may be present in the aqueous solution admixed with the aluminum salt solution form readily hydrolyzable salts which do not precipitate with the monocarboxylic acid aluminum soap.

In carrying out the invention, the fish oil, vegetable or animal oil, fat or wax is oxidized, preferably in aqueous solution, and the aqueous solution is then mixed with the aluminum salt solution to form the aluminum soap of the fatty acid present in the oxidation product.

Various oxidizing agents may be used in oxidizing the fish oil or the like, and various solvents may be used for carrying out the reaction. Likewise, aqueous solutions of various aluminum salts may be used in preparing the aluminum soap.

However, in the preferred embodiment, the fish oil or the like is oxidized by means of aqueous potassium permanganate in sulfuric acid, this oxidizing agent being selected because decolorization occurs, the use of water having the additional advantage of low cost. Also, it is preferred to use aqueous alum solution for forming the aluminum soap because of the low cost and availability of alum.

In carrying out the method, the solution comprising the oxidized fish oil or the like, is made alkaline before it is mixed with the alum solution.

After removal of the aluminum soap of the monocarboxylic acid from the solution by filtration, the filtrate may be worked up for the recovery of more or less significant amounts of the dicarboxylic acid occurring therein.

The following examples are given to illustrate specific embodiments of the invention, it being understood that these examples are not intended as limitative.

The tuna fish oil oxidized analyzed as follows:

Myristic glyceride, 4%
Palmitic glyceride, 19%
Stearic glyceride, 4%
Mixed unsaturated 16-carbon fatty acid glycerides of 2.7/2 or 1.35 double bonds, 6.2% (presuming 4.1% monenoic acid and 21.1% dienoic acid glyceride)
Mixed unsaturated 18-carbon fatty acid glycerides of 3.2/2 or 1.60 double bonds (presuming either 10.4% monenoic acid glyceride and 15.6% dienoic glyceride or some other mixture of some with some trienoic glyceride present)
Mixed 20-carbon fatty acid glycerides of 5.5/2=2.25 double bonds (presuming 23.5% mixed monenoic, dienoic, trienoic and perhaps some pentenoic glycerides present)
Mixed 22-carbon fatty acid glycerides of 6.8/2=3.4 double bonds (presuming mono-, di-, tri-, and tetrenoic acids with perhaps some penta-, hexa- and heptanoic glycerides present).

*Example 1*

One quart of Van Camp tuna fish body oil was added to a gallon of 10% aqueous sulfuric acid solution heated to 80° C. with rapid stirring. Cold 5% potassium permanganate solution was aliquoted in until decolorization was no longer rapid.

The solution was cooled and run into a tank. Phenolphthalein indicator (5 ml. of 0.65% phenolphtalein in 65% ethanol) was dissolved in the solution with stirring. Sodium hydroxide was added until the solution was red.

One and one-half ounces of ammonium chloride were added, and alum solution was aliquoted in until the subnatant fluid no longer yielded a supernatant (floating) precipitate on aliquot test.

The solution was filtered on a sintered glass filter. The precipitate was collected, washed, dried for 24 hours in a 65° C. forced draft oven, finely ground, and bottled. Portions of this material thickened benzene rapidly at 60° C., a characteristic of aluminum monohydroxy alkanoates, or aluminum soaps of the monocarboxylic acids present in the oxidation solution.

The filtrate was made alkaline and hydrogen sulfide was added to remove the manganese in the form of sulfide. After filtering, the filtrate was treated with calcium chloride and a precipitate formed which contained calcium sulfate and calcium dicarboxylic acid salts. The precipitate was separated, the odorous supernatant being discarded.

The precipitate was washed twice with 1% ammonia. It was then suspended in a sack in a hot air blast and allowed to dry to a pasty mass. The mass was mixed in a beater mixer with a dense slurry of sodium carbonate and extracted with water. The extract was treated with hydrochloric acid until evolution of carbon dioxide ceased, and calcium chloride was added until cloudiness appeared. On addition of a few drops of 28% ammonia, the cloudiness increased. Overnight, a copious precipitate formed which was collected and carefully dried. By analysis of isolated crystals, it was determined that about 1% of the precipitate comprised calcium succinate trihydrate.

The precipitate was transposed with a minimum of hot 5% sulfuric acid, and the supernatant was divided into two parts each of which was allowed to crystallize. One part was left in the acid condition, while the other part was neutralized with sodium carbonate until the evolution of bubbles ceased, before crystallizing.

The acid portion yielded succinic acid B-phase crystals; adipic, pimelic, suberic and azeleic acid crystals also appeared to be formed.

On crystallizing, the neutralized portion yielded crystals having parallel extinction and positive elongation. These appeared to be crystals of new forms of sodium succinate or sodium succinate hexahydrate from the fact that succinic acid crystals could be obtained from their acidified solution. Other unidentifiable, evidently new, crystals were also formed.

The supernatant from the transposition was boiled down, a large crop of crystals being obtained. Mixed with ethylene glycol and "cooked," a definite thickening was noted. It is believed that esterification to a polymer had occurred.

*Example II*

One quart of Van Camp tuna fish oil was added to a gallon of 10% sulfuric acid, heated to 79° C. with rapid stirring, and cold 5% potassium permanganate solution was run in until decolorization was no longer rapid.

The pH was adjusted with lye to 9.0 and hydrogen sulfide was run in to precipitate the manganese as sulfide. The precipitate was removed by filtration.

The filtrate was acidified to pH 5.0, ammonium sulfate (1.75 ounces) was added, and aqueous alum solution was added until soap precipitation was complete. The aluminum soap of the monocarboxylic acids was collected on a sintered glass filter, washed and dried.

The filtrate was acidified to pH 1.0, and an excess of calcium chloride was added. The precipitate, calcium sulfate, was removed by filtration.

The filtrate was neutralized with an excess of ammonium hydroxide and additional calcium chloride was added to complete precipitation of the calcium dicarboxylate salts.

The wet precipitate was treated with a minimum volume of 1:1 sulfuric acid to transpose it to calcium sulfate, which was removed by filtration.

On evaporation, the filtrate yielded approximately one pound of mixed dicarboxylic acids (succinic, azeleic and others).

The method is generally applicable to the isolation of fatty acids present in the aqueous solutions of oxidized marine oils. The tuna fish oil used in the examples is typical and may be replaced by bonita, menhaden or other oceanic fish body oils.

The method of isolating the fatty acids through the insoluble aluminum soap is also useful in connection with the water-soluble fatty acids contained in aqueous oxidation solutions resulting from the oxidation as described herein of other oils, fats and waxes. As representative of other oils which may be oxidized as described to yield aqueous solutions of the fatty acids may be mentioned olive, almond-kernel, neat's-foot, linseed, cottonseed, safflower seed, perilla-seed, tung, peanut, cocoanut, and soya bean oils, various seed fats, and mutton and beef tallows, as well as the various waxes.

These animal and vegetable oils and fats, and the various waxes comprise the fatty acids in complex mixtures and in the form of compounds such as the glycerides. On oxidation, the free fatty acids are liberated and react with the aluminum salt to form the corresponding aluminum soap of the acid or acid mixtures.

The method of isolating the water-soluble fatty acids from the aqueous oxidation solution is the same regardless of the oil oxidized. Thus, the aqueous oxidation solution is mixed with the excess (e.g. 5–30% more than the stoichiometric) of the aqueous aluminum salt solution and the insoluble aluminum soap which is formed and precipitates (at pH 5.0–7.0) is separated from the solution. The oxidation solution is preferably saponified and added to the aluminum salt solution. However, the aluminum salt solution can be added to an acidic fatty acid solution and precipitation of the insoluble aluminum soap effected by adding alkali (e.g. sodium hydroxide) to the mixed solutions until a pH of 5.0–7.0 is achieved. Or the aluminum salt solution can be added to the saponified oxidation solution (instead of in the reverse order), a terminal pH of 5.0–6.0 being attained.

Various changes and modifications may be made in carrying out the invention without departing from the spirit and scope thereof. Therefore, it will be understood that it is not intended to limit the invention except as it is defined in the appended claims.

What is claimed is:

1. The method of obtaining from oceanic fish body oils, an aluminum soap having the capacity to thicken benzene rapidly characteristic of aluminum monohydroxy alkanoates, which comprises adding an aqueous acid solution to the oil, heating the resulting mass, adding potassium permanganate solution to the mass, alkalizing the mass, adding a 5% to 30% stoichiometric excess of an aqueous solution of a water-soluble aluminum salt to the alkalized mass, filtering the mass, collecting the precipitate retained on the filter, and washing and drying the same.

2. The method according to claim 1, characterized in that the oceanic fish body oil is tuna fish oil.

3. The method of obtaining, from oceanic fish body oils, an aluminum soap having the capacity to thicken benzene rapidly characteristic of aluminum monohydroxy alkanoates, which comprises mixing sulfuric acid of about 10% concentration with the oil, heating the resulting mass to about 80° C., adding potassium permanganate solution of about 5% concentration to the mass, alkalizing the mass, adding a 5% to 30% stoichiometric excess of an aqueous solution of aluminum sulfate to the alkalized mass in aliquot portions until the subnatant fluid no longer yields a floating precipitate on aliquot test, filtering the mass, collecting the precipitate retained on the filter, and washing and drying the same.

4. The method according to claim 3, characterized in that the oceanic fish body oil is tuna fish oil.

References Cited in the file of this patent

UNITED STATES PATENTS

| | | |
|---|---|---|
| 2,583,607 | Sirianni et al. | Jan. 29, 1952 |
| 2,626,897 | Young, et al. | Jan. 27, 1953 |
| 2,699,428 | Lux et al. | Jan. 11, 1955 |

OTHER REFERENCES

"Fatty Acids," Markley, copyright 1947, pp. 406–410 and 434–450.